(12) United States Patent
Yang et al.

(10) Patent No.: US 11,614,723 B2
(45) Date of Patent: Mar. 28, 2023

(54) CONTROL SYSTEM AND CONTROL METHOD FOR INDIVIDUAL THERMAL COMFORT BASED ON COMPUTER VISUAL MONITORING

(71) Applicant: Xi'an University of Architecture and Technology, Xi'an (CN)

(72) Inventors: Bin Yang, Xi'an (CN); Huangcheng Yao, Xi'an (CN); Dacheng Jin, Xi'an (CN); Yuyao Guo, Xi'an (CN)

(73) Assignee: XI'AN UNIVERSITY OF ARCHITECTURE AND TECHNOLOGY, Xi'an (CN)

( * ) Notice: Subject to any disclaimer, the term of this patent is extended or adjusted under 35 U.S.C. 154(b) by 0 days.

(21) Appl. No.: 17/487,653

(22) Filed: Sep. 28, 2021

(65) Prior Publication Data

US 2022/0171356 A1 Jun. 2, 2022

(30) Foreign Application Priority Data

Nov. 30, 2020 (CN) .......................... 202011380653.9

(51) Int. Cl.
*G05B 19/042* (2006.01)

(52) U.S. Cl.
CPC .... *G05B 19/042* (2013.01); *G05B 2219/2614* (2013.01)

(58) Field of Classification Search
CPC .......... G05B 19/042; G05B 2219/2614; G05B 2219/2642; G05B 15/02; G05B 19/418; G01J 5/0025
See application file for complete search history.

(56) References Cited

U.S. PATENT DOCUMENTS

| 2016/0374606 A1* | 12/2016 | Shikii | A61B 5/4005 |
| | | | 600/301 |
| 2019/0084372 A1* | 3/2019 | Gallagher | G05B 19/042 |

(Continued)

OTHER PUBLICATIONS

Wadhwa, N., Rubinstein, M., Durand, F., Freeman, W., "Phase-Based Video Motion Processing", ACM Transactions on Graphics, Publication Date: Jul. 2013, pp. 80:1-80:9, vol. 32, No. 4, Article 80.

*Primary Examiner* — Michael W Choi
(74) *Attorney, Agent, or Firm* — WPAT, PC

(57) ABSTRACT

A control system and a control method for individual thermal comfort based on computer visual monitoring are provided. The control system may include a data acquisition device, an information processing device, an intelligent voice inquiry device, a terminal control device including a terminal controller connected to an external equipment and a biological real-time device connected to the data acquisition device and a human thermal sensation predictor. The data acquisition device includes a semi-contact measurement instrument and a contact-less measurement instrument. The contact-less measurement instrument includes an infrared sensor and a camera built with a skeletal node recognizer and an Euler video amplifier. The information processing device may include a memory, the human thermal sensation predictor for obtaining the predicted thermal sensation value and a comparator connected to the intelligent voice inquiry device. It solves the problem that the prior art cannot meet the thermal comfort.

8 Claims, 3 Drawing Sheets

(56) References Cited

U.S. PATENT DOCUMENTS

| | | | |
|---|---|---|---|
| 2020/0333033 A1* | 10/2020 | Kitagawa | G05B 13/0265 |
| 2021/0090608 A1* | 3/2021 | Zhang | H04N 5/265 |
| 2021/0145359 A1* | 5/2021 | Hunt | A61F 13/00051 |
| 2022/0009307 A1* | 1/2022 | Neveu | G06V 40/103 |

* cited by examiner

CONTROL SYSTEM AND CONTROL METHOD FOR INDIVIDUAL THERMAL COMFORT BASED ON COMPUTER VISUAL MONITORING

FIELD OF THE DISCLOSURE

The disclosure relates to the field of heating, ventilation and air-conditioning (HVAC) technologies, and more particularly to a control system and a control method for individual thermal comfort based on computer visual monitoring.

BACKGROUND OF THE DISCLOSURE

Comfortable office working environment is a premise of efficient office. At present, heating, ventilation and air-conditioning (HVAC) system widely used in office buildings consumes a lot of energy, but it does not meet a thermal comfort level required by personnel. At present, the commonly used HVAC systems, such as split-type air-conditioning system, cannot accurately measure the real-time human body temperature and thermal comfort information, and it is usually regulated only when the human body is in an uncomfortable state. Therefore, there are problems of deviation and lag/delay in this system, and the set point adjusted by residents/occupants according to their own perception cannot meet the efficient thermal comfort of human body, and is not conducive to energy saving. Another example is one-to-multiple central air-conditioning system (also referred to as multi-line central air-conditioning system or variable refrigerant flow (VRF) central air-conditioning system). The temperature and humidity regulating device is integrated into one controller, and the temperature and humidity parameters are often set according to the specifications, which makes the HVAC system unable to meet the thermal needs of people with different thermal preferences.

At present, the latest HVAC system combined with semi-contact measurement technology can track and measure human physiological parameters to monitor personnel thermal comfort, but the measurement instrument affects personnel activities, brings inconvenience or discomfort to the wearer, does not consider individual differences, and the real-time performance is lacking.

At present, the widely used HVAC control system has many limitations, such as the limitations as follows.

1. In the traditional air-conditioning and air supply system, the personnel in the office are in a relatively passive state. Affected by working conditions of the personnel, they cannot make corresponding feedback and regulation effectively and quickly. Even if the personnel actively adjust the air supply state, they cannot make accurate judgment.

2. At present, the most widely used central air-conditioning system sets the parameters according to the temperature and humidity set for group thermal comfort. Due to the different thermal preferences of each individual in the overall environment, the system cannot meet the thermal needs of each individual in the regulated environment. Moreover, the location of sensors such as temperature, humidity, $CO_2$, etc. cannot accurately reflect the situation near the personnel position, and there is a problem that there is no high air quality around the personnel.

3. Semi-contact equipment has a certain impact on human comfort and thermal comfort, as well as poor contact and incorrect wearing, resulting in poor accuracy of measurement data. Most contact and semi-contact measurement devices have a certain delay. It takes a long time to measure, collect and process data, has poor timeliness, and cannot accurately track the hot and cold state of the human body at that time.

4. Collecting personnel body temperature information by monitoring personnel's video information through contact-less measurement instrument alone will cause many disadvantages to weaken robustness.

SUMMARY OF THE DISCLOSURE

The disclosure aims to provide a control system and a control method for individual thermal comfort based on computer visual monitoring, which solves the problem that the prior art cannot meet the thermal comfort.

The disclosure is realized by technical solutions as follows.

Specifically, in one aspect, a control system for individual thermal comfort (also referred to as individual thermal comfort control system) based on computer visual monitoring may include a data acquisition device, an information processing device, an intelligent voice inquiry device, a terminal control device and a biological real-time device.

The data acquisition device may include a semi-contact measurement instrument and a contact-less measurement instrument. The semi-contact measurement instrument is arranged on a human body. The contact-less measurement instrument may include an infrared sensor and a camera. The camera has built-in a skeletal node recognizer and Euler video amplifier. The camera is configured to collect video information, and the infrared sensor is configured to collect body temperature information.

The information processing device may include a memory, a human thermal sensation predictor and a comparator. The human thermal sensation predictor is configured to correct a mathematical model between a collected skin temperature and human thermal sensation to thereby obtain a predicted thermal sensation value. The memory is configured to store a preset thermal sensation threshold. The comparator is configured to compare the predicted thermal sensation value with the thermal sensation threshold.

The intelligent voice inquiry device is connected to the comparator and configured to inquire whether parameter regulation is required, and the memory is further configured to store regulated terminal equipment parameters when the parameter regulation is required.

The terminal control device may include a terminal controller, and the terminal controller is configured to be connected to an external equipment and output an instruction to the external equipment.

The biological real-time device is connected to the data acquisition device and the human thermal sensation predictor, and configured to receive a skin temperature collected by the data acquisition device, the predicted thermal sensation value from the information processing device and the regulated terminal equipment parameters to perform machine learning and thereby record a human thermal preference.

In an embodiment of the disclosure, the information processing device may further include an optimization detector, and the optimization detector is connected to the data acquisition device and configured to optimize data sent from the data acquisition device.

In an embodiment of the disclosure, the semi-contact measurement instrument may include one selected from the group consisting of a pair of thermometric glasses, a thermometric wristband and a thermometric wristwatch.

In an embodiment of the disclosure, the skeletal node recognizer is configured to obtain matrix features of a digital image of human body posture by using an OpenPose algorithm.

In an embodiment of the disclosure, the Euler video amplifier is configured to obtain a human body facial skin temperature by using an Euler video amplification algorithm.

In an embodiment of the disclosure, the terminal equipment parameters may include a wind temperature, a wind volume and a wind speed of the external equipment.

In another aspect, the disclosure also discloses the control method of the control system for individual thermal comfort based on computer visual monitoring, including the following steps:

S1, collecting human body real-time posture information by the camera, judging a human body posture by the skeletal node recognizer, obtaining a human body facial skin temperature by the Euler video amplifier, measuring a human body skin temperature by the semi-contact measurement instrument, and collecting a human body facial skin temperature by the infrared sensor, thereby obtaining a collected skin temperature as a human body facial temperature consequently;

S2, correcting the mathematical model between collected skinl temperature and human thermal sensation by the human thermal sensation predictor to obtain the predicted thermal sensation value;

S3, comparing the predicted thermal sensation value with the thermal sensation threshold by the comparator to obtain a comparing result; and reducing an output cooling capacity of the external equipment or increasing an output heat of the external equipment when the predicted thermal sensation value is less than the thermal sensation threshold, increasing the output cooling capacity of the external equipment or reducing the output heat of the external equipment when the predicted thermal sensation value is greater than the thermal sensation threshold; and S4, inquiring an individual to-be-measured by the intelligent voice inquiry device whether there is a need of changing temperature according to the comparing result, and starting the terminal controller when there is a need of changing temperature to output a control instruction to the external equipment;

when there is no need of changing temperature, the memory stores the predicted thermal sensation value and the collected skin temperature obtained by the step S1, and the steps S2 through S4 will not be carried out when the human body facial temperature is obtained again later.

In an embodiment of the disclosure, the skeletal node recognizer obtains key points of human body joints by using an OpenPose algorithm, and specifically including:

(1) Neural Network Prediction performing a feature extraction on a collected video, and then using a two-branched multi-stage convolutional neural network, a first branch being configured to predict a standard deviation of a confidence image, and a second branch being configured to predict PAFs Lt, and predictions and image features from the first and second branches being connected after each stage and used for a next stage;

introducing an original image after being scaled with four fixed scales into the neural network to obtain four predicted values, and averaging the four predicted values to obtain a heatmap of the human body joints;

(2) Finding Joints and Obtaining Key Point Information of Human Body Joints obtaining peaks in the heatmap by using a non-maximum suppression algorithm, and using values of the obtained peaks as confidence levels;

(3) Searching for Limb Connection Points obtaining limb connections by using key point information of the human joints and paf, a built-in human body model in open pose database containing 19 limbs; determining two parts and the paf corresponding to each of the limbs, and performing an integral operation on paf information between the two parts to obtain a result as a confidence level of the limb;

obtaining all limb information after obtaining all connection information and taking each connection being regarded as one limb; and (4) Splicing Limbs to Form a Person then treating the limbs with same joints as the limbs of the same person.

In an embodiment of the disclosure, the video amplifier uses an Euler video amplification algorithm, and the Euler video amplification algorithm performs a Fourier transform to obtain a skin color saturation, and then obtains the human body facial skin temperature is obtained according to a linear relationship between skin color saturation and skin temperature.

In an embodiment of the disclosure, in the step S2, the mathematical model between collected skin temperature and human thermal sensation is expressed as the following formula:

$$TSV = a + a1 \times T1 + a2 \times T2 + a3 \times T3 + a4 \times T4;$$

where TSV is a linear function of skin temperature;

$T1$ is the human body facial skin temperature obtained by the Euler video amplifier;

$T2$ is the human body facial skin temperature collected by the infrared sensor;

$T3$ is a human body skin temperature measured by a pair of thermometric glasses of the semi-contact measurement instrument;

$T4$ is a human body skin temperature measured by a thermometric wristband of the semi-contact measurement instrument;

$a1, a2, a3, a4$ are linear parameters of the fitting model; and $a$ is an intercept.

Compared with the prior art, the embodiments of the disclosure may mainly have the following beneficial effects.

The control system and the control method for individual thermal comfort based on computer visual monitoring are disclosed. The control system includes the data acquisition device, the information processing device, the intelligent voice inquiry device, the terminal control device and the biological real-time device. The data acquisition device may include the semi-contact measurement instrument and the contact-less measurement instrument. The contact-less measurement and the semi-contact measurement are used to verify each other to prevent misjudgment, thereby improving the control accuracy and robustness of the control system. The semi-contact measurement instrument is arranged on the human body, and the human skin temperature is measured through the temperature sensor integrated on the semi-contact measurement instrument. The contact-less measurement instrument can continuously collect human physiological data in real time and the obtained data is relatively stable. The contact-less measurement instrument includes the infrared sensor and the camera. The camera is built with the skeletal node recognizer and the Euler video amplifier. The skeletal node recognizer obtains human body posture through OpenPose algorithm and makes a preliminary judgment on human thermal comfort. The Euler video amplifier obtains skin color saturation by Fourier transform through Euler video amplification algorithm, and there is a linear relationship between skin color saturation and skin temperature, so as to obtain the facial skin temperature of human. Since Euler video amplification may introduce certain errors and is completely non-invasive, and measurement instrument may be blocked by hair, hat, etc., in order to avoid misjudgment by the camera and obtain accurate facial temperature of office personnel, the infrared sensor is added to measure facial temperature again, which improves the accuracy of measurement while avoiding misjudgment. The infrared sensor can collect the facial skin temperature of the office personnel and compare it with all the data collected above, so as to further improve the accuracy of the collected information. The intelligent voice inquiry device is connected to the comparator of the information processing device to evaluate the thermal comfort through the human thermal sensation prediction module. After the comparator obtains comparison results, it will inquire whether to regulate the parameters. If it is necessary to regulate the relevant parameters, it will control the external equipment to execute the instruction. The biological real-time device is connected to the human thermal sensation predictor. The collected skin temperature, predicted thermal sensation value and the acceptability of the regulated terminal equipment parameters are sent to the biological real-time device. The biological real-time device performs machine learning while repeatedly regulating parameters to memorize the thermal preferences for regulation again, so as to reduce the complexity of the regulation process. Tracking and measuring the changes of individual body temperature, posture and thermal comfort of personnel, and controlling the external equipment, so as to meet the best thermal comfort of human body, which not only improves the thermal comfort of personnel to a great extent, but also meets physiological and psychological needs of personnel, but also reduces operation energy consumption and flexible control.

Moreover, the information processing device may further include an optimization detector connected with the data acquisition device to optimize the data sent by the data acquisition device. When the amount of information collected is large, the detection results need to be optimized to improve the accuracy of the collected information and avoid the collected data being too miscellaneous.

Figure 1:
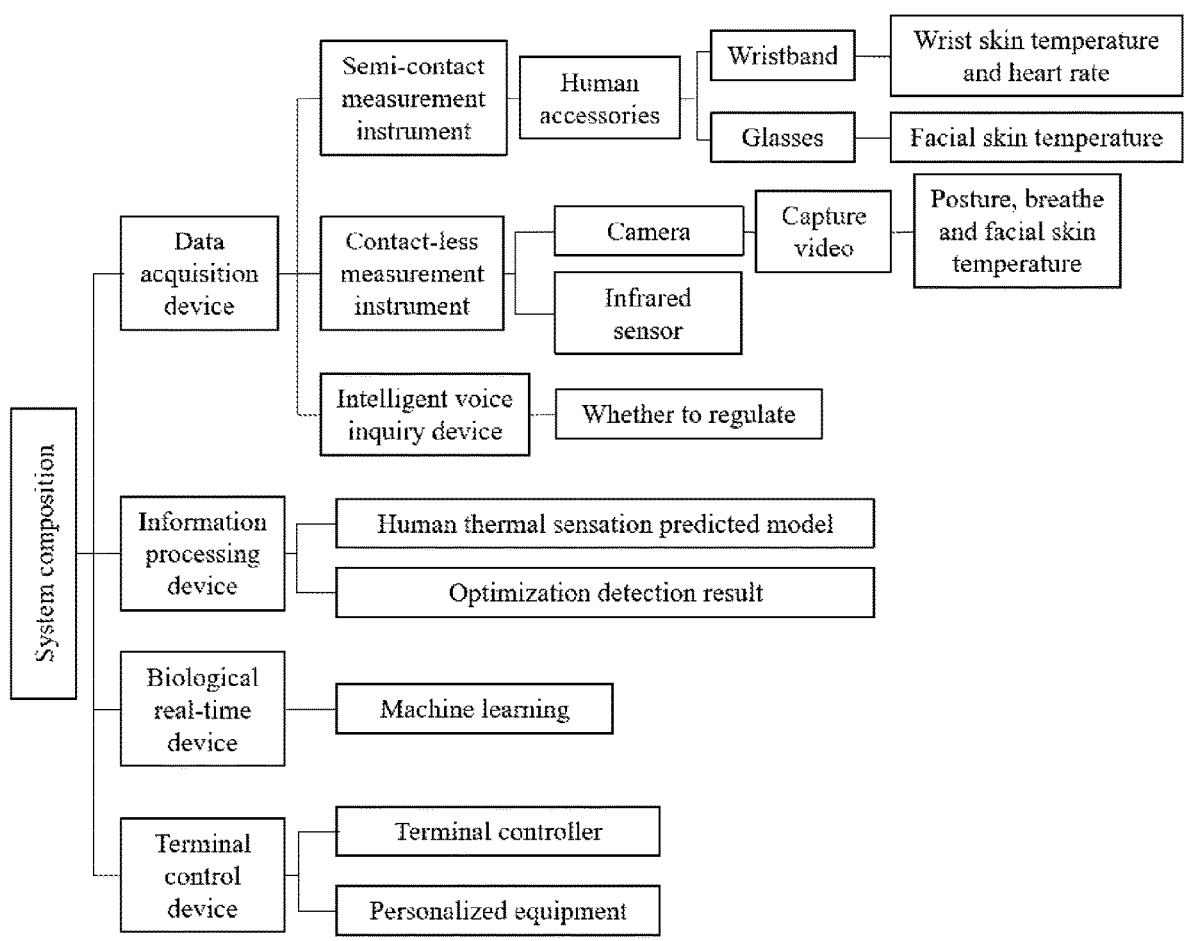
FIG. 1 is a schematic structural diagram of a control system for individual thermal comfort based on computer visual monitoring of the disclosure.

Description of reference numerals: 1: thermometric glasses, 2: thermometric wristband, 3: desk fan, 4: camera, 5: infrared sensor, 6: terminal controller.

DETAILED DESCRIPTION OF EMBODIMENTS

The disclosure is further described in detail below in combination with illustrated embodiments, which is an interpretation rather than a limitation of the disclosure.

Referring to FIG. 1, the disclosure discloses a control system for individual thermal comfort based on computer visual monitoring, including a data acquisition device, an information processing device, a biological real-time device, an intelligent voice inquiry device (also referred to as intelligent voice inquiry module), an information processing device and a terminal control device. The data acquisition device may include a semi-contact measurement instrument (also referred to as semi-contact measurement unit) and a contact-less measurement instrument (also referred to as contact-less measurement unit). The semi-contact measurement instrument is arranged on a human body. The contact-less measurement instrument may include an infrared sensor 5 and a camera 4 with temperature measurement function. The camera 4 is configured to collect video information, and the infrared sensor 5 is configured to collect body temperature information. The information processing device includes a memory (also referred to as memory module), a human thermal sensation predictor (also referred to as human thermal sensation prediction module) and a comparator (also referred to as comparison module). The human thermal sensation predictor is configured to correct a mathematical model between the collected skin temperature and human thermal sensation to obtain a predicted thermal sensation value. The memory is configured to store a preset thermal sensation threshold. The comparator is configured to compare the predicted thermal sensation value with the preset thermal sensation threshold. The intelligent voice inquiry device is connected to the comparator to inquire whether parameter regulation is required, and the memory is further configured to store regulated terminal equipment parameters when the parameter regulation is required. The biological real-time device is connected to the data acquisition device and the human thermal sensation predictor, and configured to receive the regulated parameters from the information processing device to perform machine learning and thereby record a human thermal preference. The terminal control device may include a terminal controller 6, and the terminal controller 6 is configured to be connected to an external equipment and output an instruction to the external equipment.

The semi-contact measurement instrument is mainly human body accessories, such as wearing thermometric glasses 1, thermometric wristband 2 or thermometric wristwatch. Skin temperature sensors are integrated on the thermometric glasses 1, such as at glasses holders, glasses frame and glasses legs. Facial skin temperature is measured by wireless skin temperature sensor to monitor individual thermoregulation performance and comfort. Thermometric glasses 1 are suitable for most people wearing frame glasses. Based on the existing accessories, the integrated skin temperature sensors will not have a great impact on human comfort and thermal comfort, and improve the operability. However, the thermometric glasses are not applicable to people who do not wear frame glasses. In this case, replace the glasses with wristband. The thermometric wristband 2 is integrated with a skin temperature sensor and a heart rate sensor, and the skin temperature of the wrist is measured by the skin temperature sensor, so as to monitor individual thermoregulation performance and comfort. The thermometric wristband 2 is suitable for those who do not wear frame glasses and who wear the wristband without discomfort or inconvenience. However, whether wearing frame glasses or wristbands, there may be problems with poor contact and incorrect wearing, resulting in the inability to collect accurate information and poor accuracy of measurement data.

Setting parameters of terminal equipment (also referred to as terminal equipment parameters), such as rotational speed of fan, setting temperature of indoor unit of air conditioner, wind speed, wind volume (also referred to as outlet air volume), etc., and setting temperature of heating device.

Contact-less measurement mainly relies on skeletal node recognition technology of a skeletal node recognizer (also referred to as skeletal node recognition module) and Euler video amplification technology of an Euler video amplifier (Euler video amplification module) supported by camera 4, and infrared sensor 5.

The skeletal node recognizer obtains key points of human body joints by using an OpenPose algorithm, and specifically including: (1) neural network prediction; (2) finding joints and obtaining key point information of human body joints; (3) searching for limb connection points; and (4) splicing limbs to form a person. It can be understood that the optimization detection module (skeletal node recognizer) includes a processor and a memory connected to the processor, and the memory includes software modules, executable by the processor.

(1) Neural Network Prediction

A collected video is performed feature extraction through vgg-19, and then a two-branched multi-stage convolutional neural network (CNN) is used, where a first branch is configured to predict a standard deviation of a confidence image and a second branch is configured to predict PAFsLt, and predictions and image features from the first and second branches are connected after each stage and used for a next stage.

In order to increase a receptive field without blurring parts, an original image is introduced after being scaled with four fixed scales into the neural network to obtain four predicted values, and four predicted values are averaged to obtain a heatmap of the human body joints. Therefore, the input is image$\in$ Rw$\times$h$\times$3, and the output is heatmap_avg$\in$ Rw$\times$h$\times$19 and paf_avg$\in$ Rw$\times$h$\times$38.

(2) Finding Joints and Obtaining Key Point Information of the Human Body Joints

The heatmap of the human body joints can be obtained by the step (1). Next, specific positions of the human body joints need to be extracted from the heatmap. Peaks in the heatmap are obtained by using a non-maximum suppression (NMS) algorithm, and the obtained confidence levels are used as scores of this part. Output is:

all_peaks==[($h_0$, $w_0$, $s_0$, 0), ($h_1$, $w_1$, $s_1$, 1), . . . ]\all values of a first part;

[($h_i$, $w_i$, $s_i$, i), ($h_i$+1, $w_i$+1, $s_i$+1, i+1), . . . ]\all values of a second part; . . .

where h is the height;

w is the weight; and s is the score of this part.

(3) Searching for Limb Connection Points

The key point information of the human body joints (positions and scores) is obtained by the step (2), and limb connections are obtained by the key point information of the human joints and paf. A model (i.e., human body model) contains 19 limbs. The two parts and paf corresponding to each of the limbs are determined, and an integral operation is performed on paf information between the two parts to obtain a result as a confidence level of the limb.

After obtaining all the connection information, each connection can be taken as one limb.

(4) Splicing Limbs to Form a Person

All limb information can be obtained by the step (3), and treating the limbs with the same joints can be regarded as limbs of the same person.

Compare human body posture recognized by camera 4 with the existing posture in OpenPose database. For example, set a perspiration posture as the feature. When the camera recognizes the perspiration posture, the skeletal node recognizer sends an instruction to the next process, and thereby recognizing matrix feature of a digital image of the human body posture consequently.

Euler video amplification algorithm used by the Euler video amplifier performs Fourier transform to obtain a skin color saturation and then a human body facial skin temperature according to a linear relationship between skin color saturation and skin temperature can be obtained to thereby predict thermal comfort. The terminal controller 6 sends corresponding instructions to control the temperature of air conditioner according to the posture or skin temperature, so that the human body is in a high-heat comfort state. It can be understood that the Euler video amplification module (Euler video amplifier) includes a processor and a memory connected to the processor, and the memory includes software modules, executable by the processor.

Euler video amplification technology uses linear Euler video amplification algorithm to calculate facial skin temperature, referring to the third part of "Phase-Based Video Motion Processing", ACM Transactions on Graphics, Publication Date: July 2013, pp.80:3-80:5, Vol. 32, No. 4, Article 80. This method relies on complex valued operable pyramids, thus local motion can be measured and modified. Using Fourier series decomposition, a displaced image contour f (x+$\delta$(t)) can be written as a sum of complex sine waves:

$$f(x+\delta(t)) = \sum_{\omega=-\infty}^{\infty} A_\omega e^{i\omega(x+\delta(t))}$$

where f(x+$\delta$(t)) is displacement image contour;

$A_\omega$ is amplitude;

$\delta$(t) is displacement function;

$\omega$ is each frequency band corresponding to a frequency; the frequency band of frequency $\omega$ is complex sine wave:

$$S_\omega(x,t) = A_\omega e^{i\omega(x+\delta(t))}$$

where $S_\omega$(x, t) is sinusoidal curve, which contains motion information of phase $\omega$(x+$\delta$(t)).

Due to $S_\omega$ is a sinusoidal curve, so its phase $\omega$(x+$\delta$(t)) contains motion information. Like the Fourier frequency shift theorem, the motion can be manipulated by modifying the phase. In order to isolate the motion at a specific time and frequency, the phase $\omega$(x+$\delta$(t)) is time-filtered by using a DC (direct current) balance filter. In order to simplify the derivation, it is assumed that the time filter has no effect other than removing the DC component $\omega$x. The result is expressed as following:

$$B_\omega(x,t) = \omega\delta(t)$$

where $B_\omega$(x, t) is bandpass phase;

then, multiply the bandpass phase $B_\omega$(x, t) by $\alpha$, and add it to the phase of the sub-band $S_\omega$(x, t) to obtain the sub-band result after motion amplification:

$$S_\omega(x,t) = S_\omega(x,t)e^{i\alpha B_\omega} = A_\omega e^{i\omega(x+(1+\alpha)\delta(t))}$$

where $S_\omega$(x, t) is complex sine curve;

$\alpha$ is amplification factor.

The sub-band result $S_\omega(x, t)$ is a complex sine curve whose motion is exactly $1+\alpha$ times the input. In this analysis, the motion amplification sequence $f(x+(1+\alpha)\delta(t))$ will be obtained by summing all sub-bands.

In order to avoid misjudgment (e.g., in the collected video images, personnel's faces are often covered by hair, hats, jewelry, etc.) and obtain accurate facial temperature of office personnel, and then use the infrared sensor 5 to measure the facial temperature of the office personnel. Since Euler video amplification may introduce certain errors and is completely non-invasive, and the measurement instrument may be blocked by hair, hat, etc., three methods are used for comprehensive measurement, which improves the measurement accuracy while avoiding misjudgment. The infrared sensor 5 can collect the facial skin temperature of the office personnel and compare it with all the data collected above, so as to further improve the accuracy of the collected information.

Euler video amplification technology captures subtle changes in the personnel's face, records amplitude and frequency of the changes, and can capture the changes in the contraction of facial capillaries and nose during breathing. These features are a function of the facial temperature of personnel. The premise for the Euler video amplification technology to accurately obtain the facial temperature is that the face is exposed without shielding and no invalid light source interference. If there are these adverse/unfavorable conditions, errors will occur. Therefore, a variety of methods of measuring temperature for cross verification are introduced in the disclosure to thereby prevent misjudgment.

After receiving the integrated and optimized data information above, the information processing device uses the intelligent voice inquiry device to inquire whether the working position needs parameter regulation, such as wind temperature, wind volume and wind speed or rotational speed of fan. The accuracy of the data is further improved to thereby avoid misjudgment and achieve precise control.

In an illustrated embodiment of the disclosure, the information processing device may further include an optimization detector (also referred to as optimization detection module), which is connected to the data acquisition device and configured to optimize data sent from the data acquisition device. When the amount of information collected is large, it is necessary to optimize the detection results, improve the accuracy of the collected information, and avoid the collected data being too redundant. Collect all the collected information, optimize the information to obtain accurate data parameters, and send the determined information to the human thermal sensation predictor. The mathematical model between the collected skin temperature and human thermal sensation is corrected by the human thermal sensation predictor to thereby obtain a predicted thermal sensation is expressed as the following formula:

$$TSV = a + a1 \times T1 + a2 \times T2 + a3 \times T3 + a4 \times T4$$

where T1 is the human body facial skin temperature obtained by the Euler video amplifier;

T2 is the human body facial skin temperature collected by the infrared sensor 5;

T3 is the human body skin temperature measured by the thermometric glasses 1 of the semi-contact measurement instrument;

T4 is human body skin temperature measured by the thermometric wristband 2 of the semi-contact measurement instrument;

a1, a2, a3, a4 are linear parameters of a fitting model;

a is an intercept; and

T3 and T4 are not collected due to individual differences, such as inconvenient to wear glasses and wristbands.

Thermal sensing vote (TSV, for short, represents a subjective thermal sensing value of the person to be tested at a certain time), the direct mathematical model of skin temperature and human thermal sensation is based on simple machine learning method, statistical method or linear fitting method to thereby obtain the linear functional relationship between skin temperature measured by these measurement methods and human thermal comfort. It can be understood that the optimization detection module (optimization detector) includes a processor and a memory connected to the processor, and the memory includes software modules, executable by the processor.

The comparator compares the predicted thermal sensation value with the thermal sensation threshold to obtain a comparing result. It is necessary to reduce the output cooling capacity or increase the output heat of the external equipment when the predicted thermal sensation value is less than the thermal sensation threshold; it is necessary to increase the output cooling capacity or reduce the output heat of the external equipment when the predicted thermal sensation value is greater than the thermal sensation threshold. It can be understood that the comparison module (comparator) includes a processor and a memory connected to the processor, and the memory includes software modules, executable by the processor.

However, the predicted thermal sensation value is a predicted value obtained by the fitted empirical function, and the predicted value usually has errors in order to prevent the system from responding incorrectly. Finally, the change of heat or cooling capacity of the external terminal equipment must be based on the predicted thermal sensation value, and the final response of the person is the standard change through the intelligent voice inquiry device inquires the person whether the person need to change the setting parameters of the terminal equipment.

If the feedback collected by the intelligent voice inquiry device is that the person determines that it is necessary to reduce the output cooling capacity or increase the output heat of the external equipment, the intelligent voice inquiry device records that the personnel's thermal preference is partial cooling under the skin temperature of this group, and the memory stores the record. On the contrary, the thermal preference of the person is partial heat under the skin temperature of the group, which is stored and recorded by the memory.

The data acquisition device collects the skin temperature measured in four ways, thereby obtaining four skin temperature values (of course, one of the four skin temperature values can be missing, for example, if a person does not wear glasses, T3 will be omitted); and the thermal preference of the personnel under the skin temperature recorded by the intelligent voice inquiry device, as described above (the predicted thermal sensation value TSV is only a control reference value without collection or recording, which is calculated by the fitting formula $TSV = a + a1 \times T1 + a2 \times T2 + a3 \times T3 + a4 \times T4$, as described above).

The memory stores four skin temperature values and thermal preference values, which are recorded by the machine learning of the biological real-time device. The biological real-time device is only for recording, recording the thermal preference values corresponding to the skin temperatures of the group of T1, T2, T3 and T4. The purpose of the recording is to skip the step of inquiring the personnel by the intelligent voice inquiry device if the same skin temperature value is encountered again after this process, and directly modify the setting parameters of the terminal equipment with the personal thermal preference value corresponding to the group of skin temperature values recorded by the biological real-time device to thereby increase the cooling capacity (or reduce the heat) or reduce the cooling capacity (or increase the heat).

Measure the office personnel, and an initial value can be set. By processing the information collected by the human thermal sensation prediction model, any thermal comfort can be predicted, and the prediction results can be fed back to the intelligent voice inquiry device.

In an illustrated embodiment of the disclosure, the repeatedly regulated parameters are sent to the biological real-time device for machine learning. Because all the above information collected by the data acquisition device will have errors that cannot be avoided and corrected or useful information cannot be collected, this step of machine learning is very necessary. On the one hand, it can improve the accuracy of the collected information, and truly improve human thermal comfort and energy saving. On the other hand, sending the repeatedly regulated parameters to the biological real-time device can memorize the human thermal preference, and thereafter can reduce the complexity of collecting data. If the semi-contact wearing equipment (i.e., semi-contact measurement instrument), infrared camera 4 and infrared sensor 5 have a large deviation from the voice inquiry results, the voice inquiry results shall be used as the basis to correct and optimize the measurement results of other devices to accurately determine setting values of each control parameter.

The biological real-time device is trained according to the collected skin temperature, the predicted thermal sensation and the acceptable data of rotational speed of fan or wind temperature, wind volume and wind speed at the tuyere. The biological real-time device performs machine learning while repeatedly regulating parameters to record the thermal preferences of the office personnel at working position, so as to regulate again and reduce the complexity of regulation.

The terminal control device may include a terminal controller 6, which is configured to be connected to the external equipment and output instructions to the external equipment. The external equipment may include miniature fan, split-type air conditioner, unit heater, cushion, foot pad, local heat device or personalized air supply outlet. The terminal control device outputs instructions to an actuator for controlling through the information obtained by the information processing device, so as to achieve high thermal comfort and energy saving.

During installation, it is necessary to set terminal sensor on the terminal equipment. The terminal sensor is used to monitor the wind temperature, wind volume and wind speed of the external equipment to determine whether the terminal executes the instruction after the system sends the instruction. When the system sends the instruction to change the terminal wind speed, the terminal equipment changes a gear until the personnel feel thermal comfortable.

Figure 2:
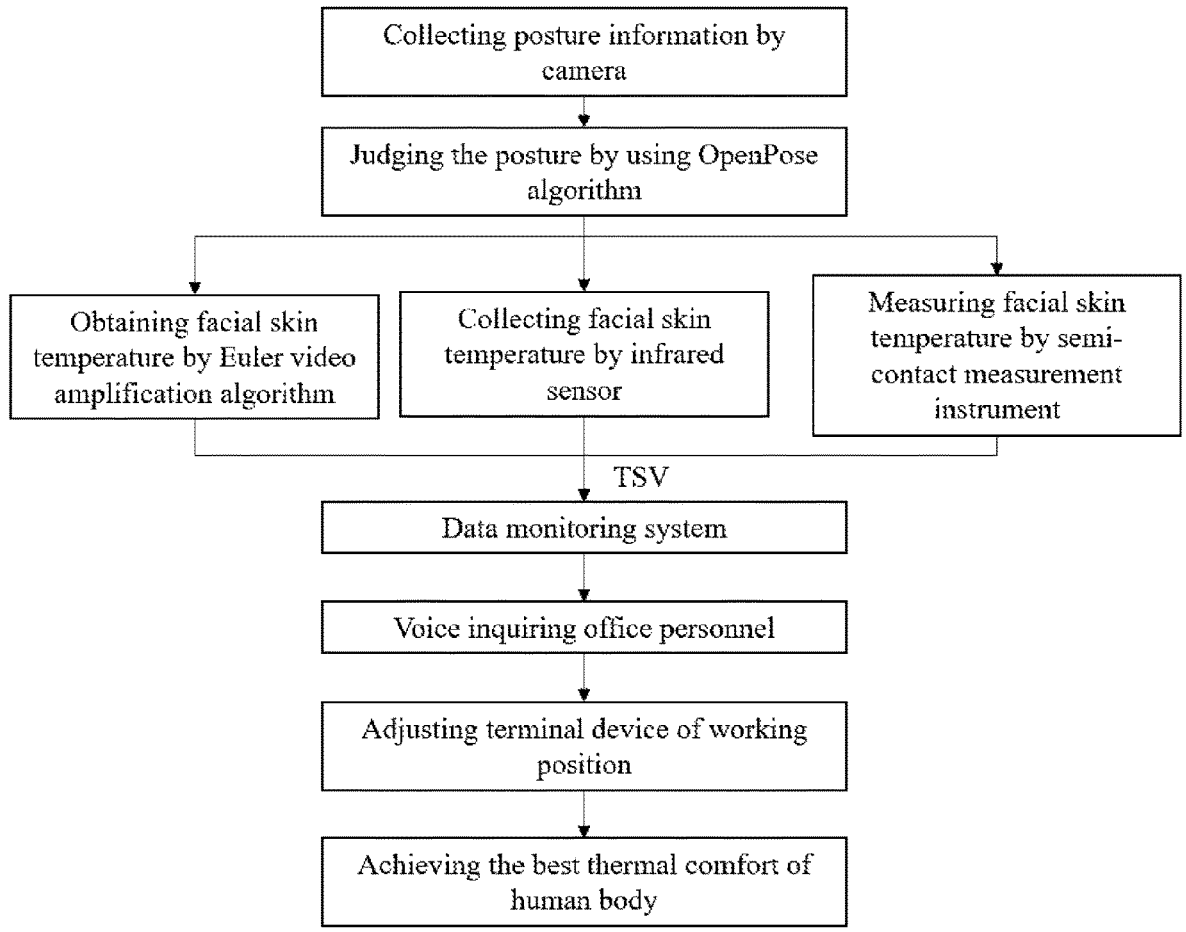
FIG. 2 is a work flow chart of a control system for individual thermal comfort based on computer visual monitoring of the disclosure.

Referring to FIG. 2, a control method of the control system for individual thermal comfort based on computer visual monitoring of the disclosure may include the following steps:

S1, collecting human body real-time posture information by the camera 4, judging a human body posture by the skeletal node recognizer, obtaining a human body facial skin temperature by the Euler video amplifier, measuring a human body skin temperature by the semi-contact measurement instrument, and collecting a human body facial skin temperature by the infrared sensor 5, thereby obtaining a collected skin temperature as a human body facial temperature consequently;

S2, correcting the mathematical model between collected skin temperature and human thermal sensation by the human thermal sensation predictor to obtain the predicted thermal sensation value;

S3, comparing the predicted thermal sensation value with the thermal sensation threshold by the comparator to obtain a comparing result; and reducing an output cooling capacity of the external equipment or increasing an output heat of the external equipment when the predicted thermal sensation value is less than the thermal sensation threshold, increasing the output cooling capacity of the external equipment or reducing the output heat of the external equipment when the predicted thermal sensation value is greater than the thermal sensation threshold; and S4, inquiring an individual to-be-measured by the intelligent voice inquiry device whether there is a need of changing temperature according to the comparing result, and starting the terminal controller 6 when there is a need of changing temperature to output a control instruction to the external equipment; the memory stores the predicted thermal sensation value when there is no need of changing temperature, and stores thermal demand of the personnel corresponding to the temperature value measured by the step S1 and the predicted thermal sensation value obtained by the step S4. The terminal controller 6 directly sends the corresponding instruction without going through the step S4 when the device subsequently measures that the personnel has the same temperature value. It can be understood that the human thermal sensation prediction module (human thermal sensation predictor) includes a processor and a memory connected to the processor, and the memory includes software modules, executable by the processor.

Figure 3:
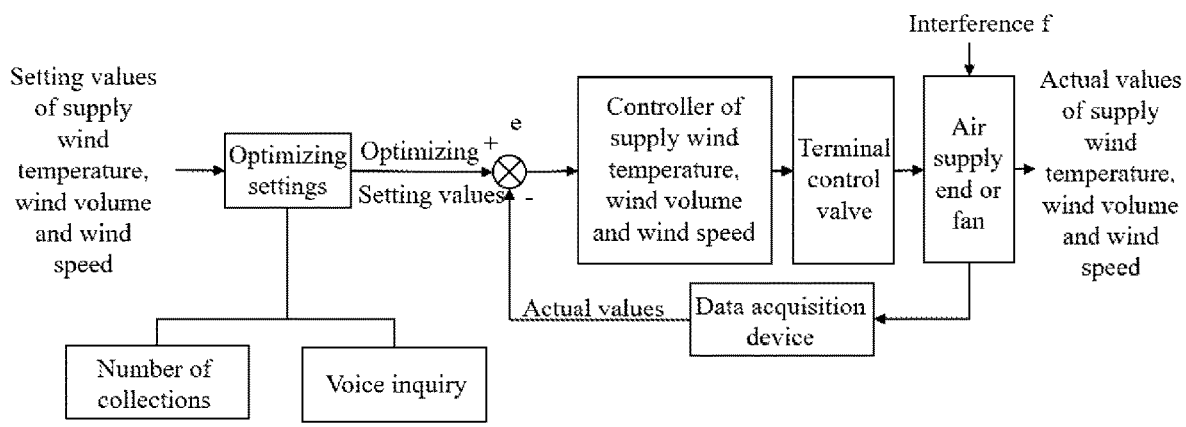
FIG. 3 is a control logic diagram of the disclosure combined with the HVAC terminal device (taking the convective heat exchanger as an example).

Referring to FIG. 3, FIG. 3 is a principal block diagram of terminal control (i.e., control logic diagram). At first, gives the relevant parameters of the system terminal, optimizes the data collected by the data acquisition device and the voice query results in the optimization detector of the information processing device to obtain an optimization setting value. If the system needs to be regulated, the terminal controller 6 controls the terminal actuator to execute instructions, so that the controlled variable of the controlled object reach the optimization setting value. If the system needs to increase the wind volume, the terminal fan increases the wind speed to thereby meet the needs of human body.

Figure 4:
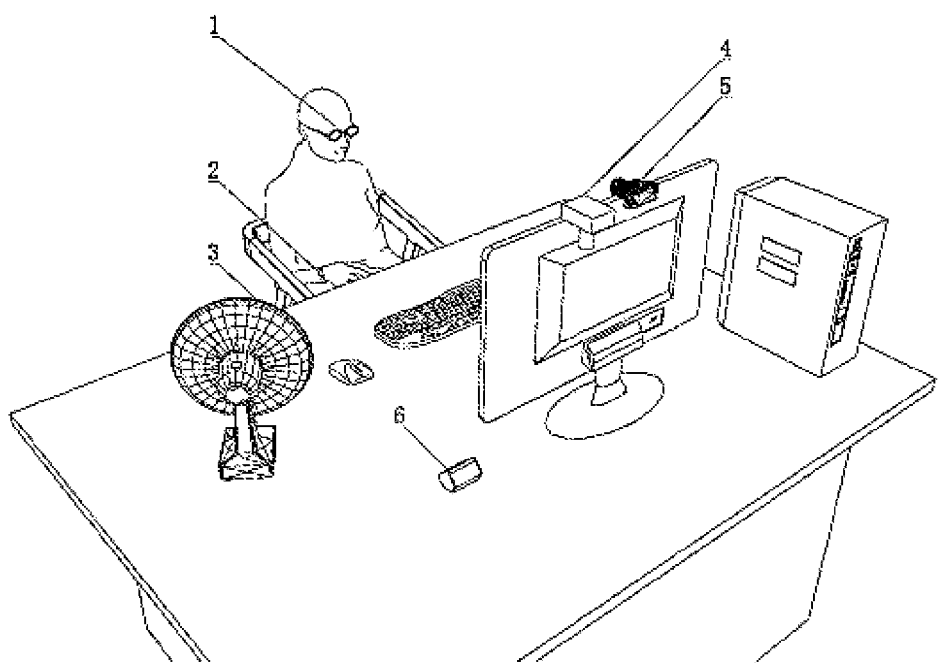
FIG. 4 is a schematic structural diagram of a terminal of a desk fan of a control system of the disclosure.

Referring to FIG. 4, taking the desk fan 3 as an example, the environment is an office environment. The camera 4 installed in front of the personnel captures the human body posture image related to the human body thermal regulation mechanism, and obtains the human body joint point information by using the OpenPose algorithm, so as to obtain the human body posture. Here, the posture is defined: wiping sweat, fanning with hands, shaking T-shirts and rolling sleeves; rubbing hands, exhaling to warm hands and embracing hands. The uncomfortable state of human body can be recognized in real-time through human body posture. Skeletal node recognition is the instruction sending terminal for the control system to start regulation. However, because the OpenPose algorithm may misjudge human actions, the Euler amplification algorithm is used to obtain the facial temperature of the office personnel and comprehensively judge the current thermal comfort.

Next, the Euler video amplification algorithm immediately performs Fourier transform to obtain skin color saturation, and then the human body facial skin temperature is obtained according to the linear relationship between skin color saturation and skin temperature to thereby predict thermal comfort. The system sends out corresponding instructions to control the temperature of the fan according to the human body posture or skin temperature, so that the human body is in a high thermal comfort state. The equipment to realize the above technology is the camera 4, which is installed on the personnel's desk and faces the personnel. The camera 4 can monitor human body posture in real time and has good following performance. However, there will be misjudgment problems, such as when people touch their forehead, it will be mistaken for wiping sweat, thinking with hands crossed will be mistaken for embracing with both hands, and when people have a thick beard, it will affect the collection of human facial skin color, etc. Therefore, further verification is carried out by the infrared sensor 5.

The infrared sensor 5 can collect the facial skin temperature of the personnel and compare it with all the collected data above, so as to further improve the accuracy of the collected information. The infrared sensor 5 is installed next to the camera 4 and is mainly used to compare the data collected here with the information collected in the above steps to ensure the accuracy of the data and further avoid misjudgment.

However, the measurement accuracy of infrared sensor 5 in the market is not very high, so it needs to be supplemented by semi-contact measurement instrument to ensure the control accuracy of the system.

The voice inquiry results shall be used as the basis to correct and optimize the measurement results of other devices to accurately determine the setting values of each control parameter when the semi-contact wearing equipment, infrared camera 4 and infrared sensor 5 have a large deviation from the voice inquiry results.

The various data acquisition methods mentioned above greatly improve the control accuracy of the control system of the disclosure and avoid situations such as misjudgment and delay judgment. In addition, the thermal comfort information collected by the data acquisition device can be transmitted to the company's employee information system for recording and storage, and matched with the employee's portrait information, so as to realize that if the employee changes their work position. The control system of the disclosure can still query the thermal comfort information of the employee according to the portrait identification, and then control the terminal of the HVAC system to achieve the thermal comfort of the employee.

Solutions to adverse situations in specific implementation are as follows.

When the information processing device collects more than one personnel on the working position, preset the video information collected by contact-less measurement instrument, select the front seat of the working position as a reference, and take a sitting posture range area as an identification area. The control system only collects the temperature information of the personnel on the working position seat to thereby adjust the setting parameters at the terminal of the heat and air-conditioning system.

When the information collected by the information processing device is not the personnel information of the company, the person of the working position should be identified first, and the thermal comfort information of the person should be transferred to the company database, and then the follow-up procedure should be followed.

If the information processing device does not collect personal information, the setting parameters of HVAC system are the minimum setting value.

If the feedback information collected by the intelligent voice inquiry device is inconsistent with the results of TSV algorithm, take the feedback information collected by the intelligent voice inquiry device as the instruction to adjust the HVAC system.

What is claimed is:

1. A control system for individual thermal comfort based on computer visual monitoring, comprising: a data acquisition device, an information processing device, an intelligent voice inquiry device, a terminal control device, and a biological real-time device;
   wherein the data acquisition device comprises a semi-contact measurement instrument and a contact-less measurement instrument, the semi-contact measurement instrument is arranged on a human body, the contact-less measurement instrument comprises an infrared sensor and a camera, the camera has built-in skeletal node recognizer and Euler video amplifier, the semi-contact measurement instrument comprises a pair of thermometric glasses and a thermometric wristband, and the Euler video amplifier is configured to obtain a human body facial skin temperature by using an Euler video amplification algorithm;
   wherein the information processing device comprises a memory, a human thermal sensation predictor and a comparator; the human thermal sensation predictor is configured to correct a mathematical model between collected skin temperature and human thermal sensation to thereby obtain a predicted thermal sensation value, the memory is configured to store a preset thermal sensation threshold, the comparator is configured to compare the predicted thermal sensation value with the thermal sensation threshold, and the mathematical model between the collected skin temperature and the human thermal sensation formula is expressed as the following formula:

$$TSV = a + a1 \times T1 + a2 \times T2 + a3 \times T3 + a4 \times T4;$$

where TSV is a linear function of skin temperature;
   T1 is the human body facial skin temperature obtained by the Euler video amplifier;
   T2 is a human body facial skin temperature collected by the infrared sensor;
   T3 is a human body skin temperature measured by the pair of thermometric glasses of the semi-contact measurement instrument;
   T4 is a human body skin temperature measured by the thermometric wristband of the semi-contact measurement instrument;
   a1, a2, a3, a4 are linear parameters of a fitting model; and a is an intercept;
   wherein the intelligent voice inquiry device is connected to the comparator and configured to inquire whether parameter regulation is required, and the memory is further configured to store regulated terminal equipment parameters when the parameter regulation is required;
   wherein the terminal control device comprises a terminal controller, and the terminal controller is configured to be connected to an external equipment and output an instruction to the external equipment; and
   wherein the biological real-time device is connected to the data acquisition device and the human thermal sensation predictor, and configured to receive the skin temperature collected by the data acquisition device, the predicted thermal sensation value from the information processing device and the regulated terminal equipment parameters to perform machine learning and thereby record a human thermal preference.

2. The control system according to claim 1, wherein the information processing device further comprises an optimization detector, and the optimization detector is connected to the data acquisition device and configured to optimize data sent from the data acquisition device.

3. The control system according to claim 1, wherein the skeletal node recognizer is configured to obtain matrix features of a digital image of human body posture by using an OpenPose algorithm.

4. The control system according to claim 1, wherein the terminal equipment parameters comprise a wind temperature, a wind volume and a wind speed of the external equipment.

5. A control method of the control system for individual thermal comfort based on computer visual monitoring according to claim 1, comprising:
  S1, collecting human body real-time posture information by the camera, judging a human body posture by the skeletal node recognizer, obtaining a human body facial skin temperature by the Euler video amplifier, measuring a human body skin temperature by the semi-contact measurement instrument, and collecting a human body facial skin temperature by the infrared sensor, thereby obtaining a collected skin temperature as a human body facial temperature consequently;
  S2, correcting the mathematical model between the collected skin temperature and the human thermal sensation by the human thermal sensation predictor to obtain the predicted thermal sensation value;
  S3, comparing the predicted thermal sensation value with the thermal sensation threshold by the comparator to obtain a comparing result; and reducing an output cooling capacity of the external equipment or increasing an output heat of the external equipment when the predicted thermal sensation value is less than the thermal sensation threshold, increasing the output cooling capacity of the external equipment or reducing the output heat of the external equipment when the predicted thermal sensation value is greater than the thermal sensation threshold; and
  S4, inquiring an individual to-be-measured by the intelligent voice inquiry device whether there is a need of changing temperature according to the comparing result, and starting the terminal controller when there is the need of changing temperature to output a control instruction to the external equipment;
  wherein when there is no need of changing temperature, the memory stores the predicted thermal sensation value and the collected skin temperature obtained by the step S1, and the steps S2 through S4 will not be carried out when the human body facial temperature is obtained again later.

6. The control method according to claim 5, wherein the skeletal node recognizer obtains key points of human body joints by using an OpenPose algorithm, and specifically comprising:
  (1) Neural Network Prediction
  performing a feature extraction on a collected video, and then using a two-branched multi-stage convolutional neural network, wherein a first branch is configured to predict a standard deviation of a confidence image, a second branch is configured to predict PAFs Lt, and predictions and image features from the first and second branches are connected after each stage and used for a next stage;
  introducing an original image after being scaled with four fixed scales into the neural network to obtain four predicted values, and averaging the four predicted values to obtain a heatmap of the human body joints;
  (2) Finding Joints and Obtaining Key Point Information of the Human Body Joints
  obtaining peaks in the heatmap by using a non-maximum suppression algorithm, and using values of the obtained peaks as confidence levels;
  (3) Searching for Limb Connection Points
  obtaining limb connections by using key point information of the human joints and paf, wherein a built-in human body model in an OpenPose database contains 19 limbs; determining two parts and the paf corresponding to each of the limbs, and performing an integral operation on paf information between the two parts to obtain a result as a confidence level of the limb;
  obtaining all limb information after obtaining all connection information and taking each connection as one limb; and
  (4) Splicing Limbs to Form a Person
  treating the limbs with same joints as limbs of the same person.

7. The control method according to claim 5, wherein the video amplifier uses an Euler video amplification algorithm, and the Euler video amplification algorithm performs a Fourier transform to obtain a skin color saturation and then obtains the human body facial skin temperature according to a linear relationship between skin color saturation and skin temperature.

8. A control method of a control system for individual thermal comfort based on computer visual monitoring, wherein the control system for individual thermal comfort based on computer visual monitoring, comprises: a data acquisition device, an information processing device, an intelligent voice inquiry device, a terminal control device, and a biological real-time device;
  wherein the data acquisition device comprises a semi-contact measurement instrument and a contact-less measurement instrument, the semi-contact measurement instrument is arranged on a human body, the contact-less measurement instrument comprises an infrared sensor and a camera, and the camera has built-in skeletal node recognizer and Euler video amplifier;
  wherein the information processing device comprises a memory, a human thermal sensation predictor and a comparator; the human thermal sensation predictor is configured to correct a mathematical model between collected skin temperature and human thermal sensation to thereby obtain a predicted thermal sensation value, the memory is configured to store a preset thermal sensation threshold, and the comparator is configured to compare the predicted thermal sensation value with the thermal sensation threshold;
  wherein the intelligent voice inquiry device is connected to the comparator and configured to inquire whether parameter regulation is required, and the memory is further configured to store regulated terminal equipment parameters when the parameter regulation is required;
  wherein the terminal control device comprises a terminal controller, and the terminal controller is configured to be connected to an external equipment and output an instruction to the external equipment; and
  wherein the biological real-time device is connected to the data acquisition device and the human thermal sensation predictor, and configured to receive the skin temperature collected by the data acquisition device, the predicted thermal sensation value from the information processing device and the regulated terminal equipment parameters to perform machine learning and thereby record a human thermal preference;

wherein the control method comprises:

S1, collecting human body real-time posture information by the camera, judging a human body posture by the skeletal node recognizer, obtaining a human body facial skin temperature by the Euler video amplifier, measuring a human body skin temperature by the semi-contact measurement instrument, and collecting a human body facial skin temperature by the infrared sensor, thereby obtaining a collected skin temperature as a human body facial temperature consequently;

S2, correcting the mathematical model between the collected skin temperature and the human thermal sensation by the human thermal sensation predictor to obtain the predicted thermal sensation value;

S3, comparing the predicted thermal sensation value with the thermal sensation threshold by the comparator to obtain a comparing result; and reducing an output cooling capacity of the external equipment or increasing an output heat of the external equipment when the predicted thermal sensation value is less than the thermal sensation threshold, increasing the output cooling capacity of the external equipment or reducing the output heat of the external equipment when the predicted thermal sensation value is greater than the thermal sensation threshold; and S4, inquiring an individual to-be-measured by the intelligent voice inquiry device whether there is a need of changing temperature according to the comparing result, and starting the terminal controller when there is the need of changing temperature to output a control instruction to the external equipment;

wherein when there is no need of changing temperature, the memory stores the predicted thermal sensation value and the collected skin temperature obtained by the step S1, and the steps S2 through S4 will not be carried out when the human body facial temperature is obtained again later.

* * * * *